Figure 1:
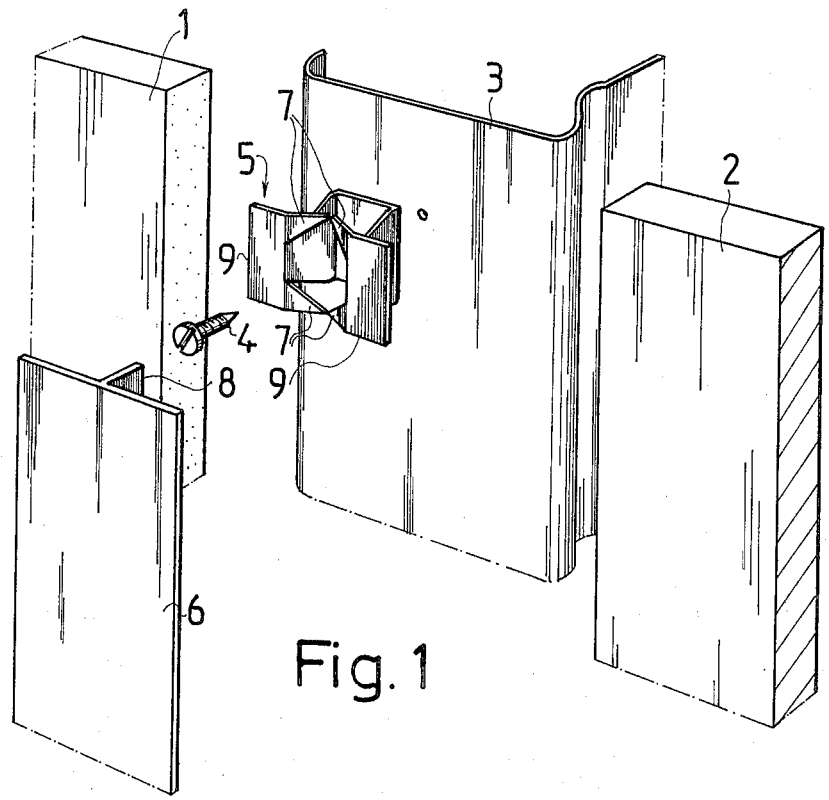

United States Patent [19]

Stahlberg

[11] 4,406,556

[45] Sep. 27, 1983

[54] MEANS FOR FIXING BOARDS ON A BASE

[75] Inventor: Erik H. Ståhlberg, Helsinki, Finland

[73] Assignee: Rakenneasennus E. Stahlberg KY, Helsinki, Finland

[21] Appl. No.: 201,490

[22] Filed: Oct. 28, 1980

[51] Int. Cl.³ .................. F16B 11/00; F16D 1/00
[52] U.S. Cl. .................. 403/23; 403/286; 403/312; 52/466
[58] Field of Search .............. 52/466, 464, 714; 403/312, 23, 286; 24/295; 411/522, 525

[56] References Cited

U.S. PATENT DOCUMENTS 2,803,858  8/1957  Rader .................... 52/464
3,950,904  4/1976  Littman .................. 52/105

FOREIGN PATENT DOCUMENTS 2336888  1/1974  Fed. Rep. of Germany ........ 52/464
531764   4/1941  United Kingdom ............... 52/464
790903   2/1958  United Kingdom ............... 52/464

Primary Examiner—Andrew V. Kundrat
Attorney, Agent, or Firm—Martin Smolowitz

[57] ABSTRACT

Means for attaching boards on a base, e.g. on a wall or ceiling, comprising U-shaped fixing pieces located between the edges of the boards and engaging therewith, and T-shaped profiled strips which cover the joints between boards. The U-shaped fixing pieces carry spikes directed obliquely towards the base and permitting the middle leg of the T of the profiled strip to be introduced without exertion into the U channel of the fixing piece, but which resist the pulling out of the profiled strip.

4 Claims, 2 Drawing Figures

U.S. Patent  Sep. 27, 1983  4,406,556

MEANS FOR FIXING BOARDS ON A BASE

The present invention concerns a means for fixing boards on a base, for instance a wall or a ceiling, comprising U-shaped fixing pieces located between the edges of the boards and engaging with them, and T-shaped profiled strips which cover the joint between the boards.

The profiled strips serve the purpose of providing a tidy cover for the joint. Difficulties have been experienced in their attachment so that they would positively remain in place.

The present invention has the object: to provide a new type of means by which the fixing of the boards is quickly accomplished and the permanent attachment of the profiled strip is ensured.

The means of the invention is characterized in that the U-shaped fixing pieces present spikes pointing obliquely towards the base and which permit the middle leg of the T-shaped profiled strip to be pushed without exertion into the U-shaped channel of the fixing piece, but which resist the pulling out of the profiled strip. The attachment of the boards is easy with the aid of the invention, and the profiled strip pressed into the joint will be positively held in place. Therefore, the joints of walls as well as ceilings are permanently tidy and attractive.

A favourable embodiment of the invention is characterized in that the spikes consist of projections punched out from the legs of the fixing piece. Thus the fixing pieces are favourable to manufacture, since together with their spikes they consist of angulated pieces of sheet metal.

Another embodiment of the invention is characterized in that the fixing piece consists of spring steel. Thanks to elasticity, the spikes bite well into the profiled strip, which according to one embodiment consists of aluminum.

The invention is described hereinafter with the aid of an example, with reference being made to the attached drawing, wherein:

FIG. 1 presents the means for fixing boards, all its parts being separate from each other.

Figure 2:
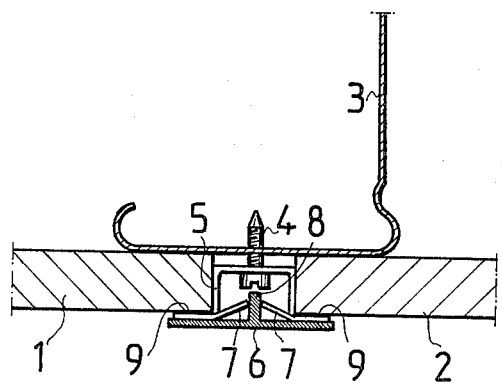

FIG. 2 shows in sectional view of the same means as FIG. 1, but where the parts have been affixed to each other.

The means is used to mount boards 1,2 on a wall or ceiling. The base consists in this case of a steel beam 3. Between the edges of the boards 1,2 reside U-shaped fixing pieces 5 attachable by the aid of screws 4 and engaging with the edges, and T-shaped profiled strips 6, which cover the joints between the boards 1,2. The fixing pieces 5 carry spikes 7 directed obliquely towards the beam 3 and which permit the middle leg 8 of the T on the profiled strip 6 to be conveniently pushed into the U channel of the fixing piece 5, but which resist the pulling out from its place of the profiled strip 6.

The fixing piece 5 is affixed to the steel beam 3 simultaneously with pushing the boards 1,2 up against the U legs of the fixing piece, and they are tightened with the screw 4. The boards 1,2 will be impacted between the beam 3 and the legs 9 of the fixing piece 5. Of the profile strip 6, the middle leg 8 is now pushed ahead into the U channel of the fixing piece 5, whereby it becomes engaged with the spikes 7 on the fixing piece. The fixing of the boards 1,2 is easily accomplished, and the joint is very attractive.

It is obvious to a person skilled in the art that different embodiments of the invention may vary within the scope of the claims presented below. For instance, the fixing base must not necessarily be the steel beam 3 shown in the example: it may on the contrary be any conceivable base to which the fixing piece can be screwed fast.

I claim:

1. An improved fastening means for attaching boards to a base, e.g. on a wall or ceiling, comprising: a U-shaped fixing piece with the legs terminating in spaced parallel lugs, said fixing piece being attached to the base and disposed between the edges of the boards and with the lugs in engagement with the exposed face of said boards; a T-shaped profile strip having a rigid plastically deformable middle leg, said strip being adapted to cover a joint formed between the boards, wherein the U-shaped fixing piece is provided with oppositely positioned elastically deformable spaced spike members formed as contiguous extensions of said lugs and directed obliquely towards the base plane of the fixing piece; said spiked members being spaced to permit said middle leg of the profiled strip to be received therein so that the spikes bite into the profiled strip for locking engagement therewith and with the undersurface of the T engaging the top surface of said lugs, and into the U channel of the fixing piece to resist withdrawal of the profiled strip from said U channel.

2. A fastening means according to claim 1, wherein: the spike members are defined by projections punched out from the legs of the fixing piece.

3. A fastening means according to claim 1, wherein: the fixing piece is formed of spring steel.

4. A fastening means according to claim 1, wherein: the profiled strip is formed of aluminum.

* * * * *